Jan. 18, 1949.  H. H. KOLBE  2,459,747
FUEL CELL FITTING
Filed May 25, 1945

Inventor
HENRY H. KOLBE

UNITED STATES PATENT OFFICE 2,459,747

FUEL CELL FITTING

Henry H. Kolbe, Los Angeles, Calif., assignor to The Firestone Tire & Rubber Company, Akron, Ohio, a corporation of Ohio Application May 25, 1945, Serial No. 595,769

1 Claim. (Cl. 285—38)

This invention relates to a synthetic-rubber fuel-cell fitting, the outer surface of which is substantially flush with the outer surface of the fuel cell, and to which an attachment—whether of plastic or metal or the like—is bolted directly.

Metal fittings have been used in fuel cells—i. e., bullet-sealing gasoline tanks—and fittings have been used which included a projection extending a considerable distance from the surface of the tank. Such fittings have proved unsatisfactory. Separation has occurred between the metal fittings and the cell walls and has resulted in leakage of the gasoline. Projections integral with the cells have been subject to damage in handling, both in the factory and in the field.

The present invention provides a fitting of synthetic rubber which is substantially flush with the wall of the cell and to which an attachment is bolted directly. The attachment can be simply and quickly replaced, and the synthetic rubber serves as a cushioning or gasket material and thus provides for a tight union between the fitting and the attachment.

Where a metal fitting has been employed, difficulty has arisen due to the attack of the fuel within the tank upon the cement employed for uniting the metal with the plastic cell composition. The structure of the present invention eliminates all metal-plastic joints, except the joint between the attachment (if of metal) and the synthetic-rubber fitting. This joint is not a cemented joint but is a pressure joint. The attachment is drawn by bolts into direct contact with the fitting without the intervention of any gasket material, and the synthetic rubber flows against the underside of the attachment sufficiently to make close contact with the entire undersurface of the attachment and thus prevent leakage.

Figure 1:
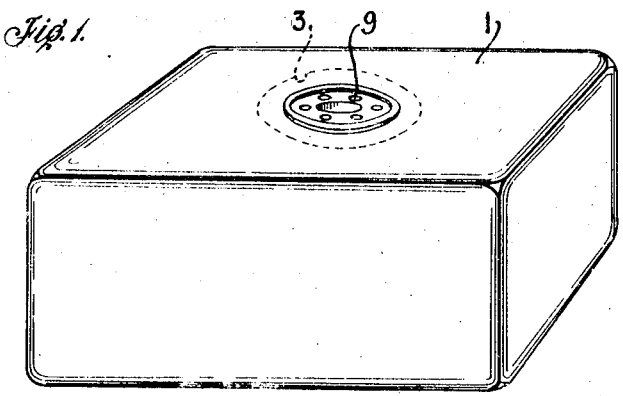
Figure 2:
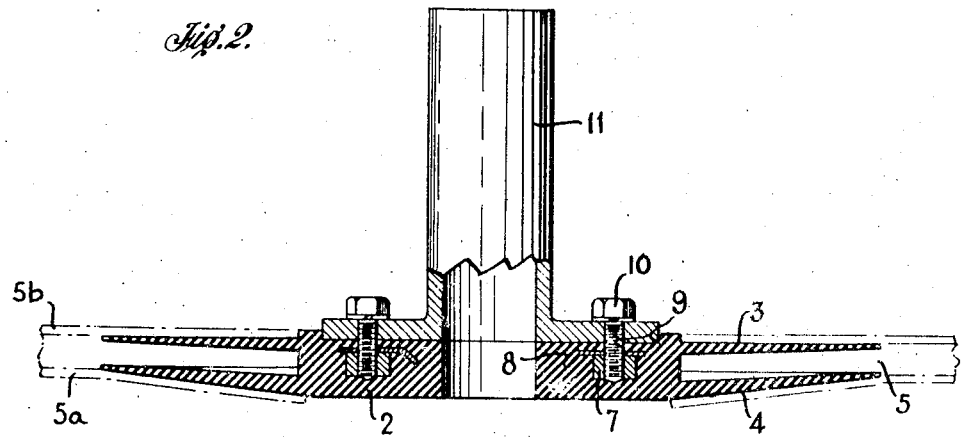

The invention will be further explained in connection with the accompanying drawings, in which:

Fig. 1 illustrates in perspective a conventional fuel tank provided with the fitting herein described, and Fig. 2 illustrates an elevation, partly in section, of an attachment bolted directly to the synthetic-rubber fitting of a fuel cell.

The fuel cell 1 is formed of any suitable bullet-sealing material. The fitting 2, which may be of Buna N or neoprene or other oil-resistant synthetic rubber, is provided with a peripheral U-shaped flange, the upper and lower portions 3 and 4 of which embrace the bullet-sealing material 5. The bullet-sealing material is ordinarily built up of various plies of material, and the inner and outer plies 5a and 5b may advantageously overlie the U-shaped flange of the fitting, as illustrated. By including the upper and lower lips 3 and 4 of the U flange between the several plies of the bullet-sealing material, a particularly strong bond is formed between the tank and the fitting. The outer ply 5b of the bullet-sealing material does not cover the whole of the outer surface of the fitting, but its inner edge is located a convenient distance from the opening through the fitting in order to provide a seat of the synthetic-rubber material of which the fitting is composed for bolting an attachment directly thereto.

The fitting is preferably assembled with the tank by placement in the opening therein when both the bullet-sealing material and the fitting are in a green or uncured condition. The surfaces of the U-shaped flange are cemented to the plies of the bullet-sealing material by a curable adhesive, and on subsequent vulcanization a leakproof unitary structure is obtained.

The upper surface of the fitting 2 is substantially flush with the wall of the fuel cell. The nuts 7 and the superimposed annular ring 8 are embedded in the synthetic material before vulcanization, and the fitting is provided with openings 9 for the insertion of bolts 10.

The nipple 11 may be of metal or suitable plastic. It is drawn directly to the cured synthetic-rubber fitting 2 by the bolts 10 without intervention of a gasket. As the bolts 10 are tightened, the surface of the fitting flows against the undersurface of the nipple and forms a tight, leakproof joint between this attachment and the fitting.

There are no projecting parts of the fitting to be damaged in the handling to which the cell is necessarily subjected in the factory and the field. The attachment 11 need not be applied until the cell is in place in an airplane or is about to be set in place. There are no cemented metal-synthetic joints exposed to the action of the fuel within the cell. All the joints are vulcanized plastic joints, except the joint between the attachment 11 and the fitting 2. Such a fuel-cell assembly has longer life than the prior-art arrangements.

What I claim is:

In combination a multi-ply bullet-sealing fuel cell with an opening in one wall thereof, in the opening an oil-resistant synthetic-rubber fitting having an opening therethrough and bolt-securing means embedded therein around the opening and being provided with a peripheral U flange, there being at least one ply of the fuel-cell material above, at least one other below and at least one other within the U flange, the fitting and fuel-cell plies being vulcanized into a unitary whole, the fuel-cell material above the flange being spaced some distance laterally from the opening in the fitting so as to provide a seat of the synthetic-rubber material for the placement of an attachment, and on the seat an attachment with an opening therein in register with the opening in the fitting and drawn directly to the fitting by bolts secured in said bolt-securing means without any intervening material between the fitting and the attachment.

HENRY H. KOLBE.

REFERENCES CITED

The following references are of record in the file of this patent:

UNITED STATES PATENTS

| Number | Name | Date |
|---|---|---|
| 1,878,063 | Todd | Sept. 20, 1932 |
| 2,326,263 | Steiner | Aug. 10, 1943 |
| 2,370,799 | Kelley | Mar. 6, 1945 |
| 2,404,766 | Hanson et al. | July 23, 1946 |